(12) United States Patent
Gandolfo (10) Patent No.: US 7,620,419 B1
(45) Date of Patent: Nov. 17, 2009

(54) COMMUNICATION AND/OR ENTERTAINMENT SYSTEM FOR USE IN A HEAD PROTECTIVE DEVICE

(76) Inventor: Antoine S. Gandolfo, 3888 Mannix Dr., Suite 318, Naples, FL (US) 34114

( * ) Notice: Subject to any disclaimer, the term of this patent is extended or adjusted under 35 U.S.C. 154(b) by 454 days.

(21) Appl. No.: 11/541,235

(22) Filed: Sep. 29, 2006

Related U.S. Application Data (60) Provisional application No. 60/787,638, filed on Mar. 31, 2006.

(51) Int. Cl.
*H04M 1/00* (2006.01)
*H04H 40/00* (2008.01)
(52) U.S. Cl. .............. 455/556.1; 455/569.1; 455/575.2
(58) Field of Classification Search .............. 455/569.1, 455/561, 556.1, 550.1, 575.2, 575.6, 3.06
See application file for complete search history.

(56) References Cited

U.S. PATENT DOCUMENTS

| | | | | |
|---|---|---|---|---|
| 5,721,783 | A * | 2/1998 | Anderson | 381/328 |
| 5,771,441 | A * | 6/1998 | Altstatt | 455/66.1 |
| 5,978,689 | A * | 11/1999 | Tuoriniemi et al. | 455/569.1 |
| 6,658,267 | B1 * | 12/2003 | Baranowski et al. | 455/556.1 |

* cited by examiner

*Primary Examiner*—Sonny Trinh
(74) *Attorney, Agent, or Firm*—William F. Hamrock, PA (57) ABSTRACT

The present invention is a communication or entertainment device that includes a first component and a second component. The first component includes a microphone and earpiece to be worn by the wearer. The second component is wirelessly coupled to the first component. This second component controls the activation and functions of the first component. The first component includes at least one of the following features: a jack for cellular phone, and a jack for radio, CD player, and MP3. This combination provides a device that is ideally suited for those who wear helmets and still want to have the ability and accessibility to communicate or to be entertained.

20 Claims, 10 Drawing Sheets

COMMUNICATION AND/OR ENTERTAINMENT SYSTEM FOR USE IN A HEAD PROTECTIVE DEVICE

This is a utility application claiming priority of Provisional Application No. 60/787,638, filed Mar. 31, 2006, which is hereby incorporated by reference in its entirety.

BACKGROUND OF THE INVENTION

1. Field of the Invention

The present invention relates generally to a communication and/or entertainment system that is designed and configured to be utilized with any conventional head protective device. Rendering a device that will provide an adequate and efficient means of communicating or entertaining. The present invention utilizes a wireless method for successful communication or entertainment purposes.

2. Description of the Prior Art

Bicycling and motorcycling is quickly becoming a favorite past time for more and more people. With these favorite hobbies on the rise, it is not surprising that head injuries are inherently increasing as well. To reduce the chance of head trauma, head protective devices or helmets can be used. Unfortunately, many individuals for whatever reason do not utilize helmets.

Manufactures have seen the dilemma and thus have tried to alter and change the helmet so as to provide for a more appealing product. Enhancing the product will hopefully encourage users to utilize the helmet and thus, reducing the possibility of head injuries should an accident occur.

Methods of enhancing helmets include providing a radio system therein. Many of these types of helmets incorporating radio systems do not provide a wireless method for activating and deactivating the system. The need to activate and deactivate such systems manually can be distracting, thereby providing for a device that can be dangerously distracting to riders of motorcycles and other users of the systems.

As evidenced, various helmet devices are well known to the prior art. Numerous devices are out on the market in a variety of forms and configurations so as to provide the consumer various options for adapting a helmet to suit their particular needs.

However, the current helmet devices on the market are limited in their scope and use. Accordingly, it can be seen that there exists a need for device that can be retrofitted into an existing helmet, that will provide for an entertainment system and that will also allow the user to communicate with others. Such an apparatus should be versatile, compact in size, light in weight and simple in construction so as to provide a device, which is successful, and can easily be used by any individual regardless of age, physical ability or dexterity.

As will be seen, the present invention achieves its intended purposes, objectives and advantages by accomplishing the needs as identified above, through a new, useful and unobvious combination of component elements, which are simple to use, with the utilization of a minimum number of functioning parts, at a reasonable cost to manufacture, assemble, test and by employing only readily available material.

SUMMARY OF THE INVENTION

In one embodiment, the present invention is a novel and unique device that is adapted to be retrofitted into any conventional helmet or the like. The present invention is ideally suited for, but not limited to helmets used for cycling, motorcycling, skateboarding, firefighters, law enforcement officers, or the like. Thus, the present invention provides the user with a wireless method of either communication or optionally, entertainment purposes. Optionally, a helmet can be provided with the device to provide for a second embodiment, device plus helmet, eliminating the need for the user to retrofit the device to a conventional helmet. The second embodiment would be a combined helmet incorporating the communication or entertainment device.

To provide such a communication system, the present invention includes a first component, known as the remote, and a second component, known as the base unit. The first component or remote is designed and configured to be secured or retrofitted into a desired helmet or the like. This remote includes a headphone/listening system that enables sound to be transmitted thereto. Additionally, the remote includes a communication system with a microphone for communication purposes.

Enhancing the present invention, multiple remotes can be provided, providing for each individual in a group to have his or her own remote device. This will permit communication to occur among wearers of a remote. Such a situation is advantageous for those traveling or working in-groups, such as firefighters on a job, cyclists traveling cross-country, or even friends enjoying a leisurely drive on a motorcycle. This configuration ultimately allows the user to determine the number of remotes desired, one, two, or even several depending on its intended use.

The second component or base includes a system having input jacks for attaching conventional audio hardware and/or a conventional cellular phone or the like. Thus, the second component or base includes at least one input jack, but preferably two jacks are utilized. This will provide for one jack that is designed and configured for a cell or two way radio that is removable secured thereto, while the second jack enables the attachment of a conventional audio input device, such as, but not limited to, a radio, CD player, MP3 player, a multimedia device or the like. Increasing its usability, the base includes a communicating feature that will allow the wearer to communicate with others who are also wearing a remote.

Each component, the remote and the base, has function buttons that control the desired operation. To use the system, the user inserts the desired device's conventional electrical connector into the appropriate input jack. Once the device, for example a radio, is thus attached by insertion into the jack of the connector, the user selects the desired operation via the appropriate function button, located on either the remote or base.

Operation is possible due to the configuration of the remote and the base. The remote and base are electrically and wirelessly coupled to each other. To enable such a design, each unit includes a digital signal processor (DSP). The remote and base are battery powered. Thus, each unit includes a battery cell. This battery cell can be recharged via conventional recharging means. Thereby the remote and the base each include a port for accepting a conventional recharging connector.

The base is attached or located at a convenient location for the user. For example, for use on a bicycle, motorcycle or the like, the controller is removably secured to the handlebars. For use with a fire fighter helmet or the like, the device can be attached to a glove, coat or the like. The purpose and location of the controller is to provide a convenient and quick method of operating and controlling the first component.

The base includes a unique design and configuration that is ideally suited for a riding apparatus, such as a bicycle, motorcycle or the like. The housing includes an arrow like configuration. This unique design provides an aerodynamic profile for providing quality and reducing turbulence and resistance. In addition, an attaching system is provided that facilitates and eases the attachment of the base to a conventional handle bar, thus ultimately providing a unit that is easy and quick to install.

In an alternative embodiment, several remotes can be utilized for enabling communication to occur among several users. In this design, the individuals wearing the remotes can be in communication with each other. Such an embodiment would be beneficial to a group of workers, such as law enforcement officers, fire fighters or the like. In this embodiment, each individual in the group would be supplied with a remote. The remotes would be in communication with each other.

Accordingly, it is the primary object of the present invention to provide for a wireless method of either communication or entertainment while an individual is wearing a helmet.

Another object of the present invention is to provide for a wireless method of either communication or entertainment that can easily be retrofitted into any conventional helmet.

A further object of the present invention is to provide a wireless communication or entertainment device that will overcome the deficiencies, shortcomings, and drawbacks of the prior art and methods thereof.

Yet another object of the present invention is to provide for a device that will successfully enable communication or entertainment to occur for a user of a helmet without sacrificing the safety of the user.

A final object of the present invention, to be specifically enumerated herein, is to provide a wireless communication or entertainment device in accordance with the preceding objects and which will conform to conventional forms of manufacture, be of simple construction and easy to use so as to provide a device that would be economically feasible, long lasting and relatively trouble free in operation.

Although there has been many communication or entertainment systems associated with helmets, none of the inventions have become sufficiently compact, low cost, and reliable enough to become commonly used. The present invention meets the requirements of simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention taken in conjunction with the accompanying drawings.

BRIEF DESCRIPTION OF THE DRAWING

Similar reference numerals refer to similar parts throughout the several views of the drawings.

DESCRIPTION OF THE PREFERRED EMBODIMENT

As illustrated in FIGS. 1-9, the communication or entertainment device 10 of the present invention is comprised of a first component member, known as the remote 12 and a second component, known as the base 14. The first component or remote is designed and configured to fit inside any conventional helmet H, while the second component or base 14 is designed to fit at a comfortable and convenient location for the user. For example, for a cyclist, the base could fit on the handlebars of the bicycle or motorcycle, while for a fire fighter; the device could easily fit on their gloves, sleeves or the like.

In essence, the present invention includes two components. The base is adapted to removably receive, by attachment through insertion into jacks on the base, conventional elements for entertainment and/or communication. The entertainment elements include, but are not limited to radio, CD player, MP3, multimedia devices or the like. The base is wirelessly coupled to the remote. The remote includes an ear set as well as a microphone. Consequently, during utilization, the user selects the desired entertainment/communication mode and the information is transmitted through the base to the remote. This provides for the desired option to be heard via the head set and/or transmitted via the microphone. The user can control the desired entertainment or communication mode via the base or the remote. Inherently, optimizing the flexibility of use of the unit.

In another embodiment, more that one remote can be coupled with the base to render communication and entertainment for more than one individual. In this configuration, each individual can be entertained via the music that is selected and optionally each member who wishes to communicate with one another is provided with a remote. The design allows for the individual to enjoy the entertainment value of what is playing via the base.

Optionally, using the communication mode of the present invention enables communication with the individuals who are supplied with separate remotes 12. For example, communication between the passenger and driver of a motorcycle can occur via the use of the communication mode. The driver and passenger would each have a remote. Inherently rendering a means of communicating between individuals who are each supplied with a remote that is in electrical communication with the base.

To enable such a configuration, the first component or remote 12 includes housing 16a and a communication unit 16b. This housing provides protection for the electrical components used in the operation and transmission of information via the base 14. As such, the housing can be sized to accommodate the various elements located therein. The housing is also designed to fit comfortably within the helmet or the like. The communication unit 16b includes the means for enabling communication to occur. Accordingly this communication unit includes an ear set and microphone. It is noted that the housing 16a and communication unit 16b can be a singular unit or optionally, the two can be separate entities.

Figure 1:
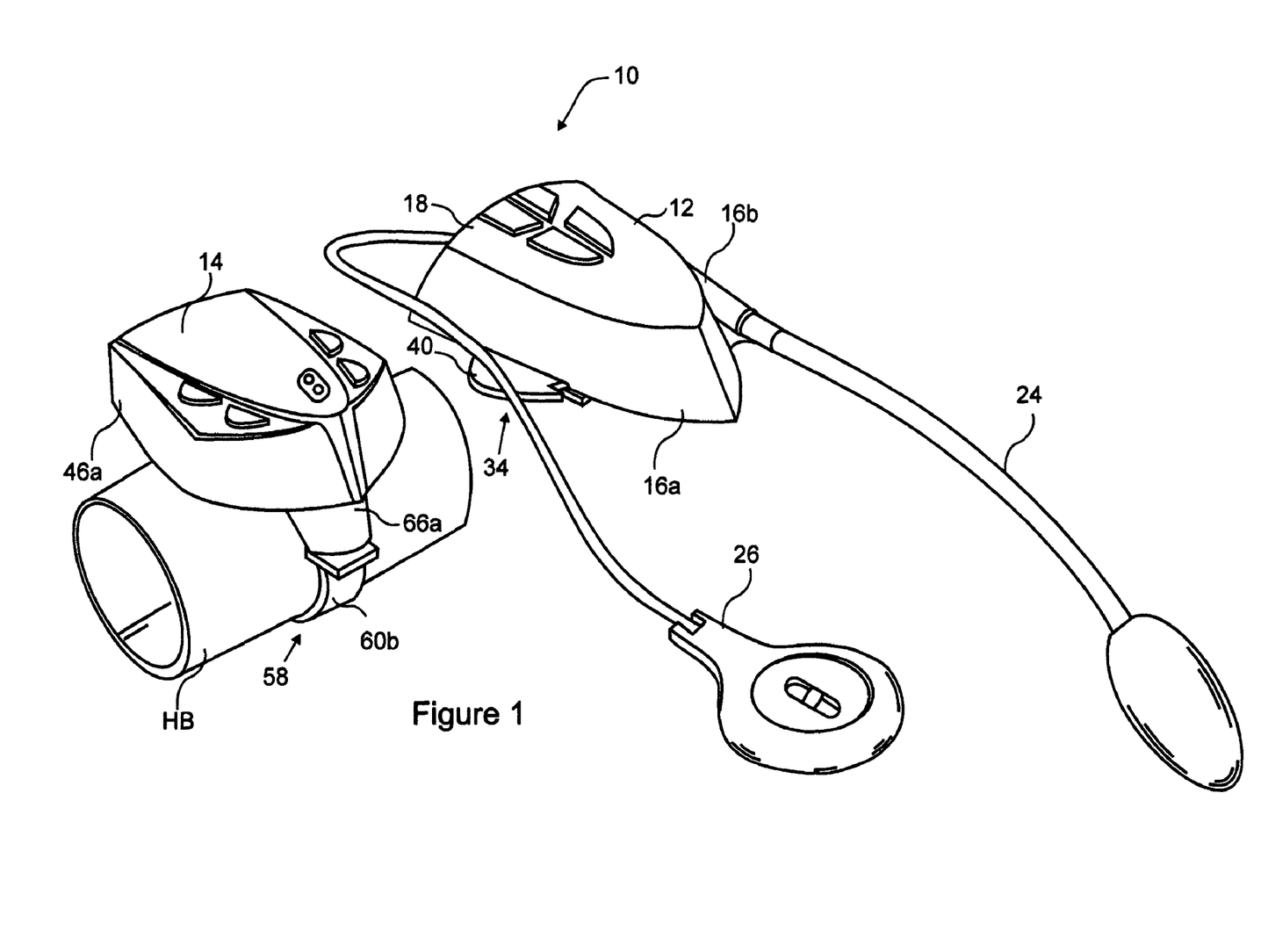
FIG. 1 is a perspective view of remote and based of the present invention.
Figure 2A:
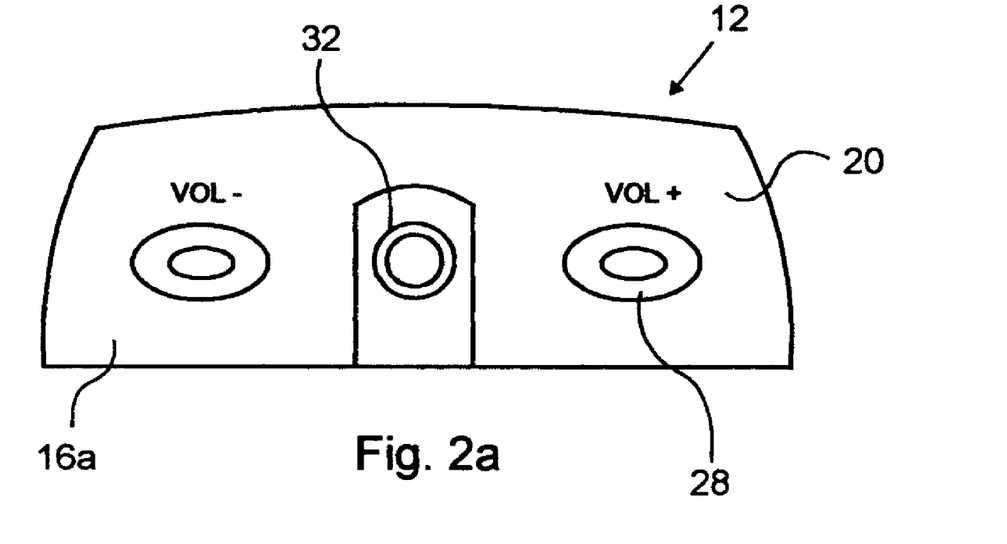
FIG. 2a is a rear view of the remote of the present invention.
Figures 2B, 2C:
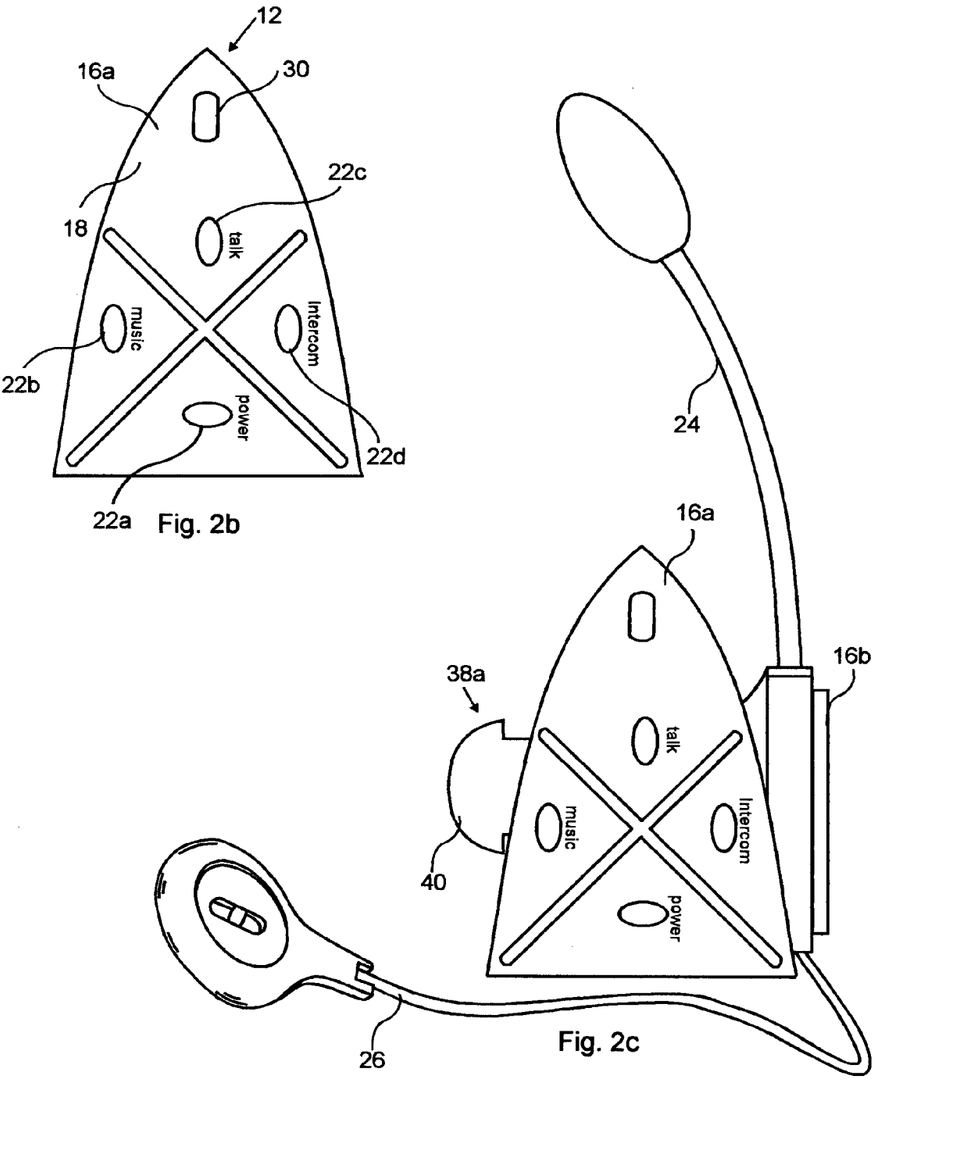
FIG. 2b is a top view of the remote of the present invention.
FIG. 2c is a top view of the premote of the present invention having the attaching element attached thereto.
Figure 2D:
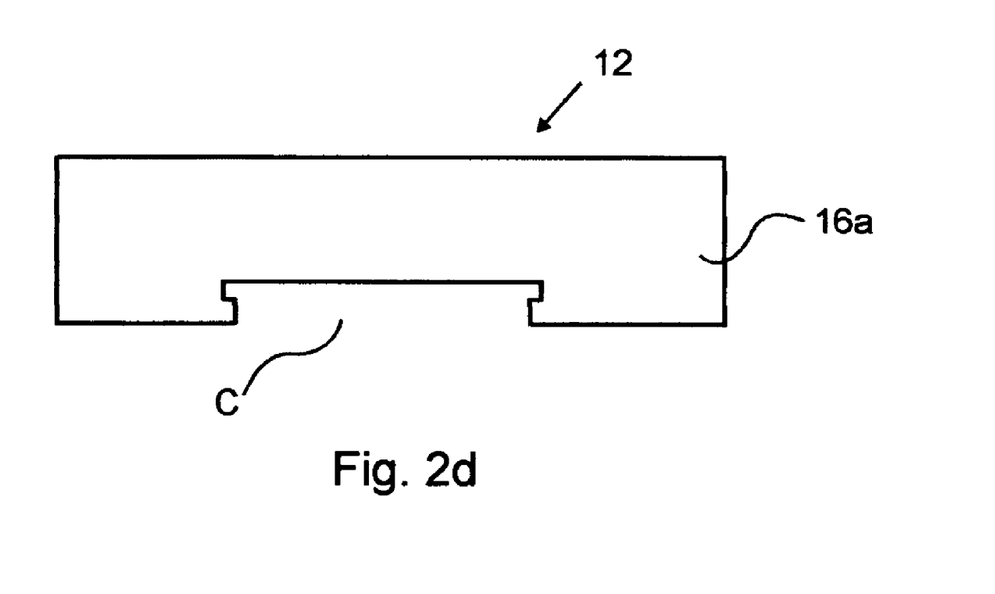
FIG. 2d is a side view of the remote of the present invention.

As seen in FIGS. 1-2c, the housing 16a includes an upper surface 18 and a rear section 20. Extending through the lower portion of the remote is a channel C, illustrated in FIG. 2c. This channel C is provided when the remote is designed to removably receive the attaching element. This channel is provided when the communication unit is a separate entity from the remote.

As seen in FIGS. 1-2b, the upper surface 18 of the remote includes a controlling system for controlling the unit if desired by the user. Since the base is adapted to receive various conventional elements, the controlling unit includes activation/deactivation buttons. Each button is a switch for activating or deactivating a communication/entertainment element as well as activating or deactivating the remote itself. As seen in the figures, the buttons include a power button 22a, music/registration button 22b, a talk button 22c, and an intercom button 22d. These buttons allow the user to activate/deactivate the desired elements. The power button 22a allows the user to activate the remote. Once activated, the user can select the desired option. The music/registration button is for activation of the conventional musical/registration element, such as the DVD player, radio or the like. The talk button 22c activates the microphone for enabling communication to occur thereto.

The intercom button enables the activation of the earpiece and microphone so that communication can occur between two devices. Thereby allowing the wearer of the remote to adequately and effectively communicate with a desired individual. The use of the intercom button is ideally suited for when the remote is used with at least two or more people. For example, in the case of a pair of cyclists, the driver and the passenger would each have a remote attached to their helmets. Communication occurs between the two parties once the intercom button is depressed.

It is noted that the buttons can include any design or configuration. As seen in FIGS. 1 and 2b, two varying designs are utilized. The purpose of the buttons are to provide a switch mechanism for activation and deactivation the various functions of the present invention.

As seen in the drawings, electrically coupled to the remote 12 is a conventional microphone 24 and also a conventional earpiece 26. The microphone 24 will allow the user to communicate verbally while the earpiece 26 constitutes a means of listening for the user. The microphone and earpiece are conventional products and are specifically structured to operate in a wireless environment. In one embodiment the microphone and earpiece can be affixed to the remote unit. In an alternative embodiment, and as is preferred, the microphone and earpiece are removably secured to the remote via an attaching element.

Figure 3A:
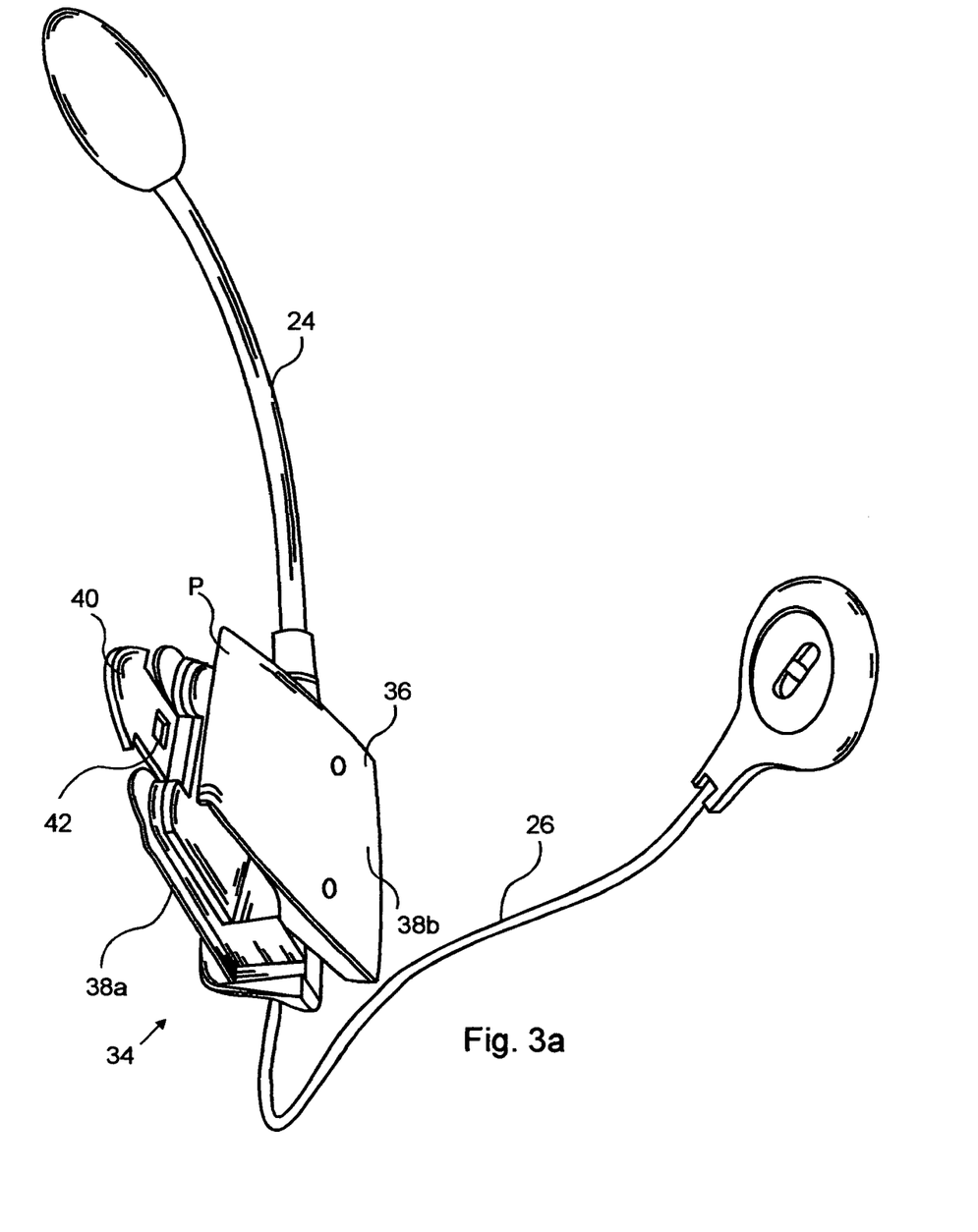
FIG. 3a is a perspective view of the attaching element used in attaching the remote to a conventional helmet.
Figure 3B:
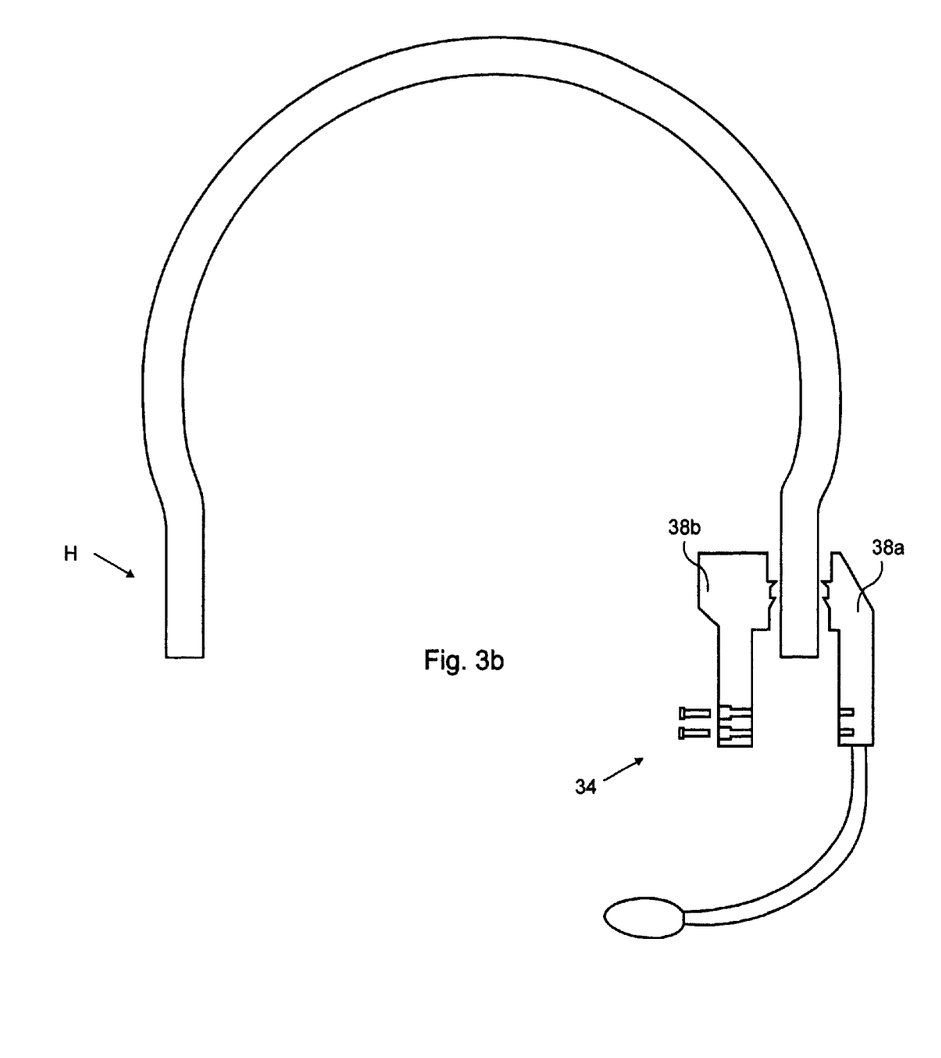
FIG. 3b is a cross-sectional view of the attaching element and remote secured to a conventional helmet.

The attaching element is further illustrated in FIGS. 3a and 3b. For enhancing the product, the present invention includes a means 28 of adjusting the volume of the entertainment/communication device. This means 28 of adjusting the volume is preferably located at the rear section of the remote.

The remote further includes a power indicator 30. This power indicator 30 provides a visual means of seeing if the unit is fully charged and capable of operation. The power indicator is preferably a light source, such as, but not limited to an LED. This will alert the user if the unit is in operational mode. Powering the remote unit 12 occurs via the use of batteries. The batteries can be recharged and thus a conventional recharging element can be coupled to the remote for allowing the batteries to be recharged. This conventional recharging element can be removably secured to the remote via a charging port 32. Though not illustrated, it is noted that the charging port can be provided with a removable cover. Such a design will allow for the port to be protected and covered when the recharging feature is not in use. To use the recharger, the user would merely remove the cover, that can be secured thereto by a hinge, and allow charging to take place. It is also noted that the battery housing is a compartment separate from the other electrical components housed within the housing.

Attaching the remote 12 to the helmet is achieved by the use of an attaching element 34. As seen in the FIGS. 1, 3a and 3b, the attaching element 34 comprises of a securing or attachment plate 36. This securing plate includes an upper portion 38a that is hindgedly secured to a lower portion 38b. When open, the upper portion and lower portion will receive the helmet. Inherently providing for the helmet to be sandwiched between the two portions. The upper portion includes a mating element 40 that is adapted to be slideably located within the channel of the remote. The locking means can be provided for enabling the remote to be locked into a secure position. One example of a locking device that can be used is shown in FIG. 3a. As seen the mating element 40 can include an aperture 42. Located within the channel of the remote is an extending member E (illustrated in FIG. 2d) that can be received with this aperture. For utilization, the user slides the mating element 40 into the channel of the remote. The extending member will lock into the aperture for securing the remote to the securing plate.

To provide for a more snug fit, the interior of the upper portion 38a can include a cushioning or padding material P. In addition, the interior of the lower portion 38b can include a cushioning layer, or optionally a plurality of cushioning strips. The purpose of the cushioning layer or strips will increase the coefficient of friction to ultimately decrease slippage or the like. To further ensure the securement of the device to the helmet, additional securement devices can be used.

The additional securement devices are designed and configured to be removable and thus is achieved via conventional securing elements. As seen in FIG. 3c, at least one aperture is shown extending through the lower portion 38b. Channels, extend through the upper portion 38a. To secure the upper and lower portion together, conventional screws are adapted to extend through the lower portion 38b via apertures to the channels. This will allow for the upper portion 38a to be secured to the lower portion 38b and hence provide for the attaching device to be secured to the desired location. The interior of both the upper portion and lower portion can also include teeth or the like, as illustrated, but not labeled in FIG. 3b. Such a configuration will further ensure the attachment to the helmet, since the teeth will grab onto the soft material of the helmet, while not destroying the material.

The communication unit 16b, as seen, is secured to the upper portion 38a of the attaching element 34. When secured to the helmet, the user can easily secured the ear set to his ear and place the microphone comfortable under the helmet an in proximity to his mouth. Such a configuration will inherently provide for a comfortable fit while not sacrificing on the safety for the user.

It is further noted that the ear set can be provided with hook and loop material. Such a configuration will allow for the earpiece to be removably secured to the interior of the helmet. This will provide a unique and convenient means of storage the ear set when not in use.

Thus to use the device, the securing or attachment plate is secured to a desired location inside the helmet. The location should preferably be comfortable for the user and allow the user to easily utilize the earpiece and microphone. To secure the securing plate of the remote to the helmet, conventional means are utilized. In the preferred embodiment, conventional screws are used. Once the base plate is secured, the mating element, which includes channels corresponding to the channels of the securing plate, slides thereon, allowing the mating element to be attached to the securing plate. This will allow for the remote to be located securely within the helmet.

The base 14, like the remote, includes housing 46a and is illustrated in FIGS. 1, and 5-7. The housing 46a protects the electrical components located therein. The housing 46a includes a top surface 46b, a lower surface 46c and a rear surface 46d. As seen in these figures, the top surface includes control buttons for controlling the element to be played. Each button is a switch for the activation or deactivation of a communication/entertainment element as well as for activating or deactivating the base itself. This design and configuration will allow the user to activate the desired element either through the use of the remote as identified for FIGS. 1-4 or optionally through the base.

As seen in the figures for the base, FIGS. 1, and 5-7 the buttons include a power button 48a, music/registration button 48b, a talk button 48c, and an intercom button 48d. This configuration allows the user to activate/deactivate the desired elements. The power button 48a allows the user to activate the remote. Once activated, the user can select the desired option. The music/registration button is for activating the conventional musical/registration element, such as the DVD player, radio or the like. It is noted that when two or more individuals are wearing the remote, the music/registration that is coupled to the base is transmitted to each remote. Thereby in the example of the motorcycle driver and passenger, each of who is wearing a remote, both will hear the same music. The talk button 48c activates the microphone for enabling communication to occur.

The intercom button enables the activation of the earpiece and microphone for communication between or among two or more individuals who are each wearing the remote. This enables the wearer of the remote to adequately and effectively communicate with a desired individual who is also wearing a remote. For example, with a pair of cyclists, the driver and the passenger would each have a remote attached to their helmets. Communication occurs between the two parties once the intercom button is depressed.

The base further includes a power indicator 50. This indicator 50 provides a visual means of indicating if the unit is fully charged and capable of operation. The power indicator is preferably a light source, such as, but not limited to an LED. This will alert the user if the unit is in operational mode. Powering the base 14 occurs via the use of batteries. The batteries can be recharged and thus a conventional recharging element can be coupled to the remote for allowing the batteries to be recharged. This conventional recharging element can be removably attached to the base via a charging port 52. Though not illustrated, it is noted that the charging port can be provided with a removable cover. Such a design will allow for the port to be protected and covered when the recharging feature is not in use. When in use, the user would merely remove the cover, which can be hingedly secured thereto, and allow for charging to take place. It is also noted that the battery housing is a compartment separate from the other electrical components housed within the housing.

Figures 5, 6, 7:
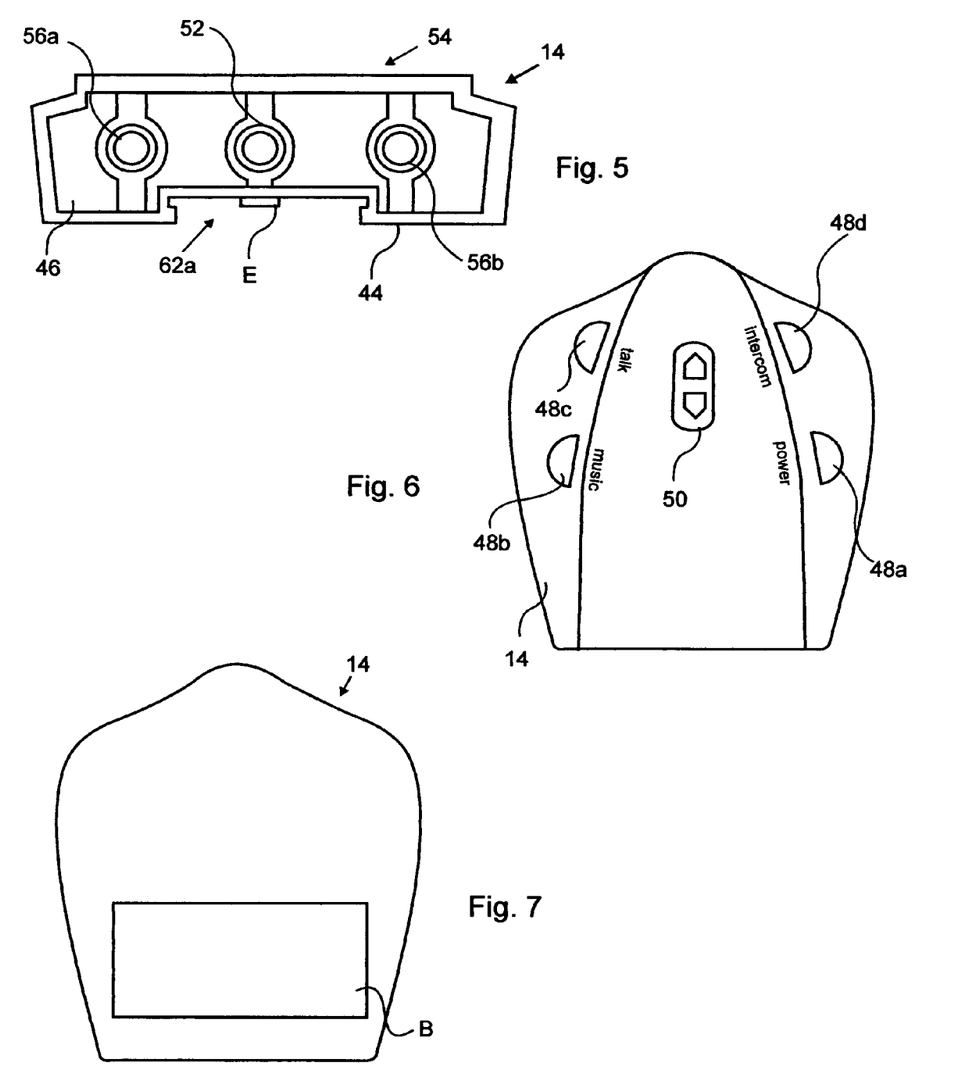
FIG. 5 is a rear view of the base of the present invention.
FIG. 6 is a top view of the base of the present invention.
FIG. 7 is a bottom view of the base of the present invention.

For communication/entertainment options to be transmitted to the remote from the base, the base has an attachment system 54 for accepting the conventional audio hardware and/or conventional cellular phones or the like. Thus, the second component or base includes at least one input jack. Preferably, two jacks are utilized. Shown is the use of two input jacks 56a and 56b. This will provide for one jack 56a to receive a cell phone or two-way radio, while the second jack 56b enables attachment of a conventional audio input device, such as, but not limited to radio, CD player, MP3, multimedia devices or the like. It is noted, though not illustrated, that each input jack can be provided with a removable cover. Such a design will allow for each jack to be protected and covered when not in use. To use the device, the user would merely remove the cover, which can be secured thereto by a hinge, and attach the device. As seen in FIG. 7, a battery is housed within battery housing B. It is noted that the housing for the battery can be located at any convenient location of the base.

In summary, to use the present invention, the user selects the options that are to be plugged into the base. For example, the user may wish to use a CD player and cell phone. In this example, the user would activate both the remote and base via the power button. Using conventional electrical connectors, the CD player is coupled to the base via the connectors through the audio input jack. The cell phone is coupled to the base via conventional electrical connectors. To listen to music, the user depresses the music switch on either the remote or the base. When receiving a phone call, the user merely depresses the talk button on either the remote or base. To summarize, once the conventional elements are coupled to the base via the jacks; the user selects the desired operation via the appropriate function button, located on either the remote or base.

Operation is possible due to the configuration of the remote and the base. The remote and base are electrically and wirelessly coupled to each other. To enable such a design, as seen in FIG. 4, the remote includes a digital signal processor (DSP) that allows for wireless communication with the base, which as seen in FIG. 9 also includes the digital signal processor (DSP).

Figure 4:
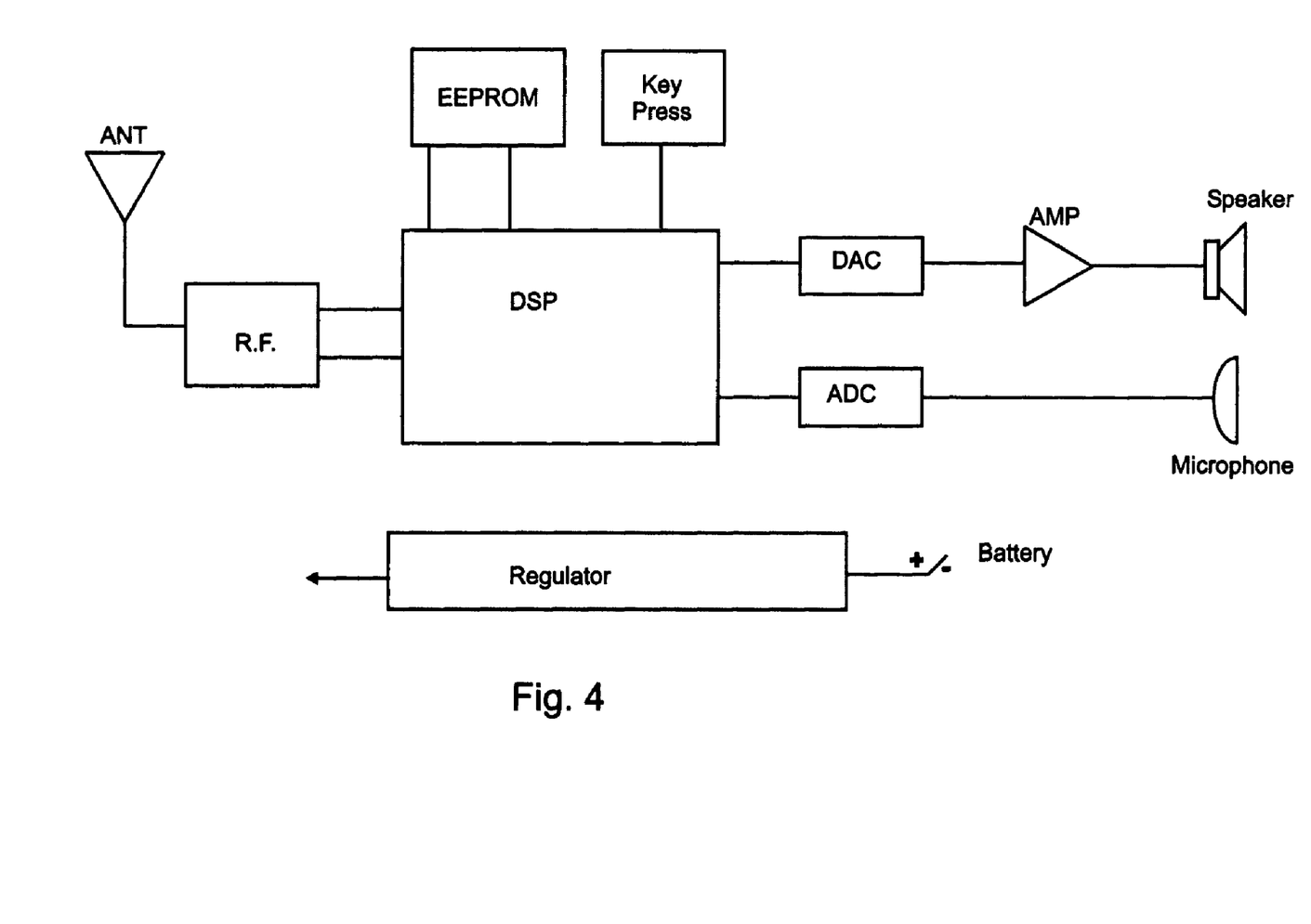
FIG. 4 is a block diagram illustrating the schematics of the remote of the present invention.

As seen in FIG. 4, activation switches or buttons are coupled to the DSP. In FIG. 4, the activation switches are labeled as Key Press. The activation switches as seen in FIGS. 1-3b include the power button 22a, music/registration button 22b, talk button 22c, and intercom button 22d. Once a function is activated, the antenna ANT is activated for receiving the audio waves (radio frequency) RF into the DSP. Once received the DSP sends the information through a converter that converts from digital to analog. It gets amplified through the AMP and then transmitted to the speaker SPK that is the earpiece of the remote. Communication via the microphone occurs when the user speaks into the microphone MIC that allows for the audio waves to be converted from analog to digital through the DSP and to a second remote via the transmission of radio frequency through the antenna. The Electrically Erasable Programmable ROM (EEPROM) is used since it is a rewritable memory chip that holds its content without power. A regulator is also utilized for maintaining a defined voltage.

Figure 9:
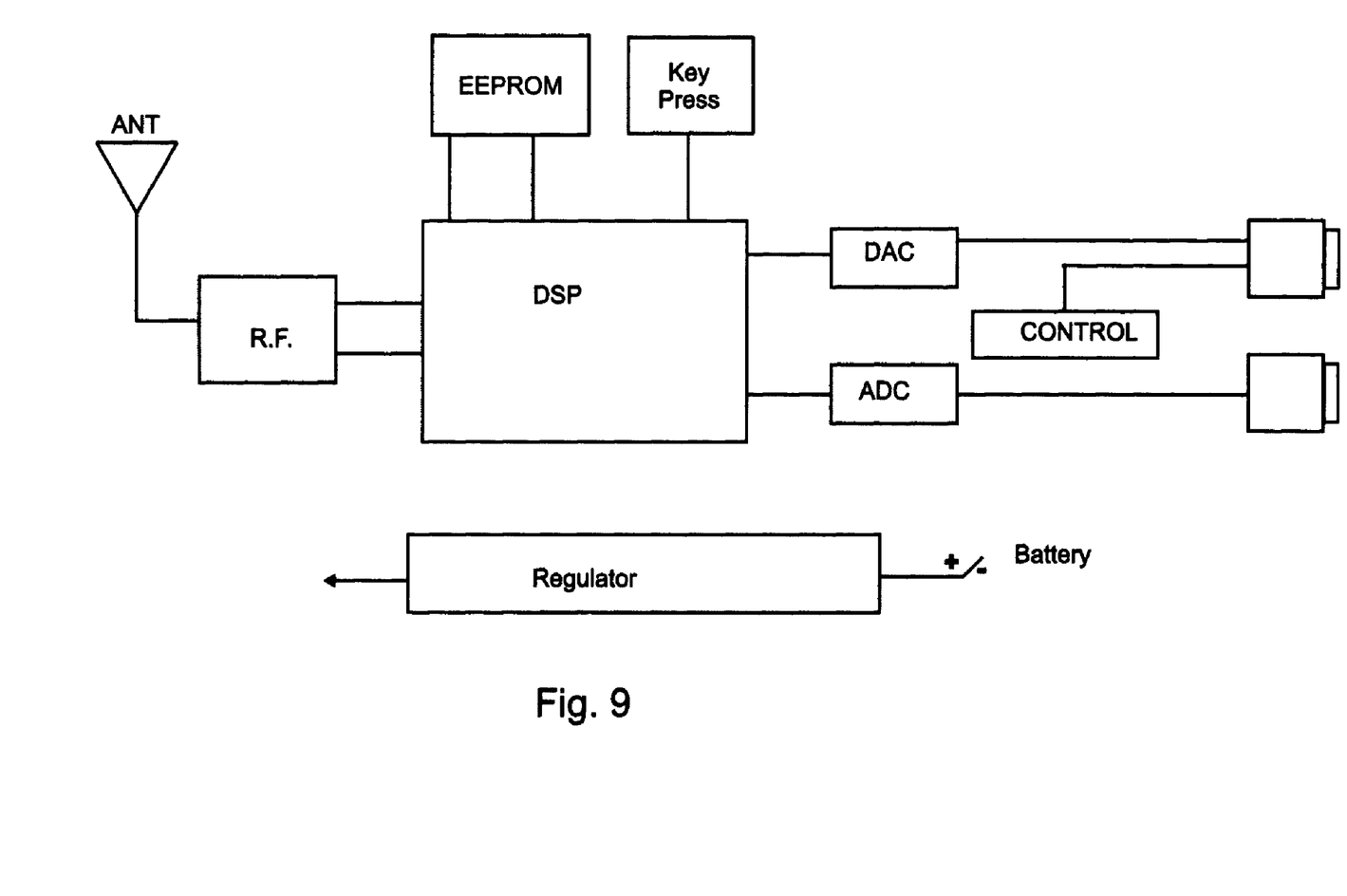
FIG. 9 is block diagram illustrating the schematics of the base of the present invention.

As seen in FIG. 9, the base, like the remotes, uses a digital signal processor (DSP) that allows for wireless communication with the remote. The jacks are adapted to receive the mobile or cellular phone via conventional electrical connectors. This jack is labeled as Mobile Phone in the figure. Another jack is adapted to receive via conventional electrical connectors the conventional music-multimedia. This music-multimedia can be any conventional musical element, such as, but not limited to radio, CD players or the like. This jack is labeled as Music-Multimedia. Once the components are received within the respective jacks, the base can be activated, as seen in FIG. 9, via the activation switches or buttons. Once activated the desired function is selected via the switches. The activation switch and activation buttons are labeled as Key Press. These switches are coupled to the DSP. The activation switches as seen in FIGS. 4 and 5 include the power button 48a, music/registration button 48b, talk button 48c, and intercom button 48d. Once a function is activated, the assembly is activated. Thereby, the analog signals from the Mobile Phone are supplied to a controller, labeled as CONTROL and then transmitted to the analog-to-digital converter ADC. The digital signals are then transmitted to the DSP, which forwards the information to be transmitted via the antenna ANT by way of the wave frequencies RF. The antenna can transmit the information to any remote of the present invention. The Music-Multimedia signals are transmitted to the analog-to-digital converter ADC. The digital signals are transmitted to the DSP, which forward the information to be transmitted via the antenna ANT by way of the wave frequencies RF. The antenna can transmit the information to any remote of the present invention.

The invention ultimately provides a unit including a remote and base that is characterized by wireless communication. This is a versatile unit that allows for a multiplicity of use while not jeopardizing the safety of the wearer. Entertainment and communication is achieved successfully and effectively.

As seen in the drawings, the housing of the base can include an arrow like shape. This shape is ideally suited when the housing is attached to a moving vehicle, such as a motor cycle, scooter, bicycle or the like. This arrow like configuration provides an aerodynamic profile to the best quality. Thereby reducing wind resistance and turbulence.

The base can be attached to a desired location for the user by the use of an attaching system 58. The attaching system can include any design and/or configuration. The purpose of the attaching system is to enable the base to be attached to a desired location. The following configuration of the attaching system has proven to be successful in the attachment of the base to conventional handlebars. It is to be understood that variations of this designed can be made for successfully attaching the base to any desired location. For example the attaching system can be reconfigured for allowing attachment to occur onto the sleeve of a firefighter or the like. The purpose of the attaching system 58 is to secure the base to the desired source.

Figure 8A:
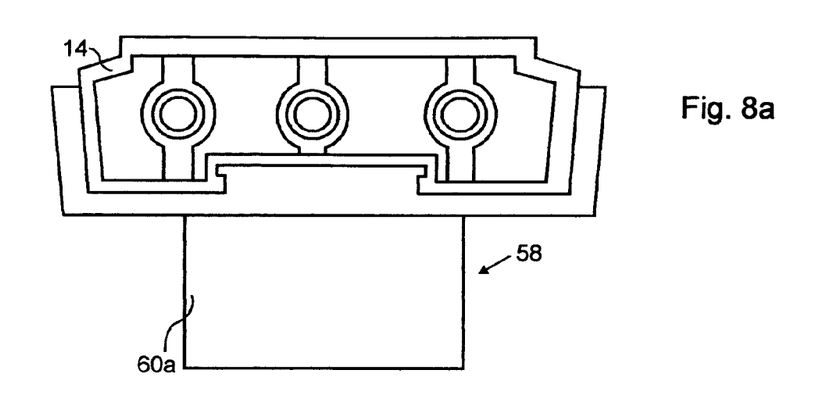
FIG. 8a is a rear view of the base secured to the housing of the upper portion of the attaching system of the present invention.
Figure 8B:
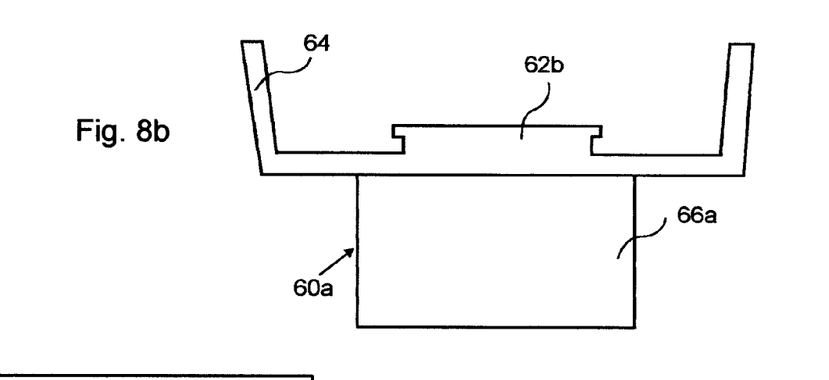
FIG. 8b is a rear view of the upper portion of the attaching system without the base attached thereto.

In the desired embodiment, and as seen in FIGS. 1, 8a-8c, the attaching system includes an upper portion 60a and a lower portion 60b. The upper portion 60a is configured to receive and accept the base. Accordingly, the base includes a channel region 62a, illustrated in FIGS. 5 and 8a. The upper portion of the attaching system includes a corresponding element 62b for removably receiving the base. As can be seen, the attaching system provides for the housing of the base to slidably mate with the channels upper portion. Wings 64 can extend upwardly from the upper portion 60a for surrounding the base when secured thereto, and as shown in FIG. 8a. These wings are optional for use and are not utilized in FIG. 1.

Figure 8C:
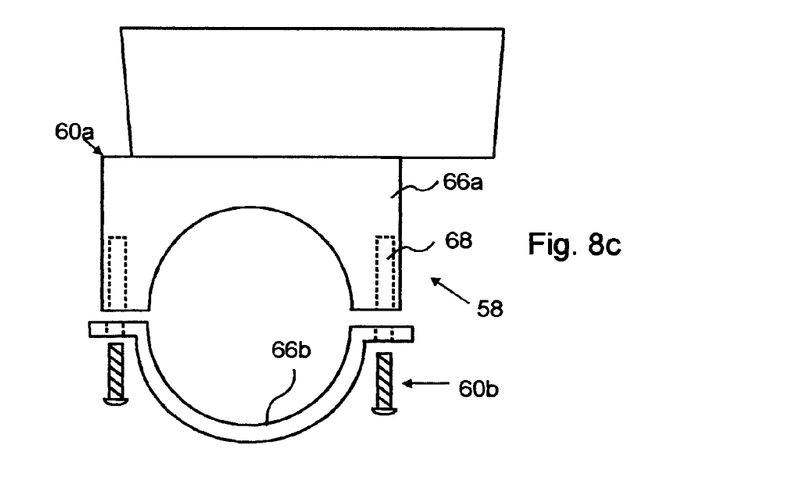
FIG. 8c is a side view of the upper and lower portions of the attaching system used with the base of the present invention.

Extending downwardly from the upper portion 60a is a receiving member 66a. This receiving member 66a is designed and configured to receive the upper area of a conventional handlebar of a motor cycle or the like. The receiving member as seen in FIG. 8c includes a semi-circular region, illustrated but not labeled, for receiving the handlebars. The lower portion 60b includes a second semi-circular region, illustrated but not labeled, for receiving the lower portion of the handlebars. This will allow for the lower portion to be removably secured to the upper portion. This removable securement is achieved via conventional securing elements. As seen in FIG. 8c, conventional screws are adapted to extend through the lower portion 60b via apertures (shown in outline) to the channels 68. This will allow for the upper portion 60a to be secured to the lower portion 60b and hence provide for the attaching system to be secured to the desired location. FIG. 1 illustrates the base of the present invention secured to a conventional handle bar (partial shown) HB.

It is further noted that the attaching system can include a locking means. The locking means can be any conventional form or the like. The purpose of the locking means is to ensure that the base securely attached to the upper portion of the securing system. An example of a locking system that has been used to produce favorable results in shown and discussed for the locking system of the attaching element used for the remote. Thus, the corresponding element can include an aperture. The channel located within the base can include a flange member or extending member that is designed to be removably secured thereto. Thus, the attaching system locks into place one the flange member or extending member is received within the aperture.

In order to utilize the present invention, each remote 12 is coupled to a conventional helmet H via the attachment system. The base 14 is then attached to the desired location via the attachment system. Once attached, the system is ready for use.

The user places the helmet on his head, attaches the earpiece from the remote onto his or her ear and adjusts the microphone to the desired location for the comfort of the user.

Figure 10:
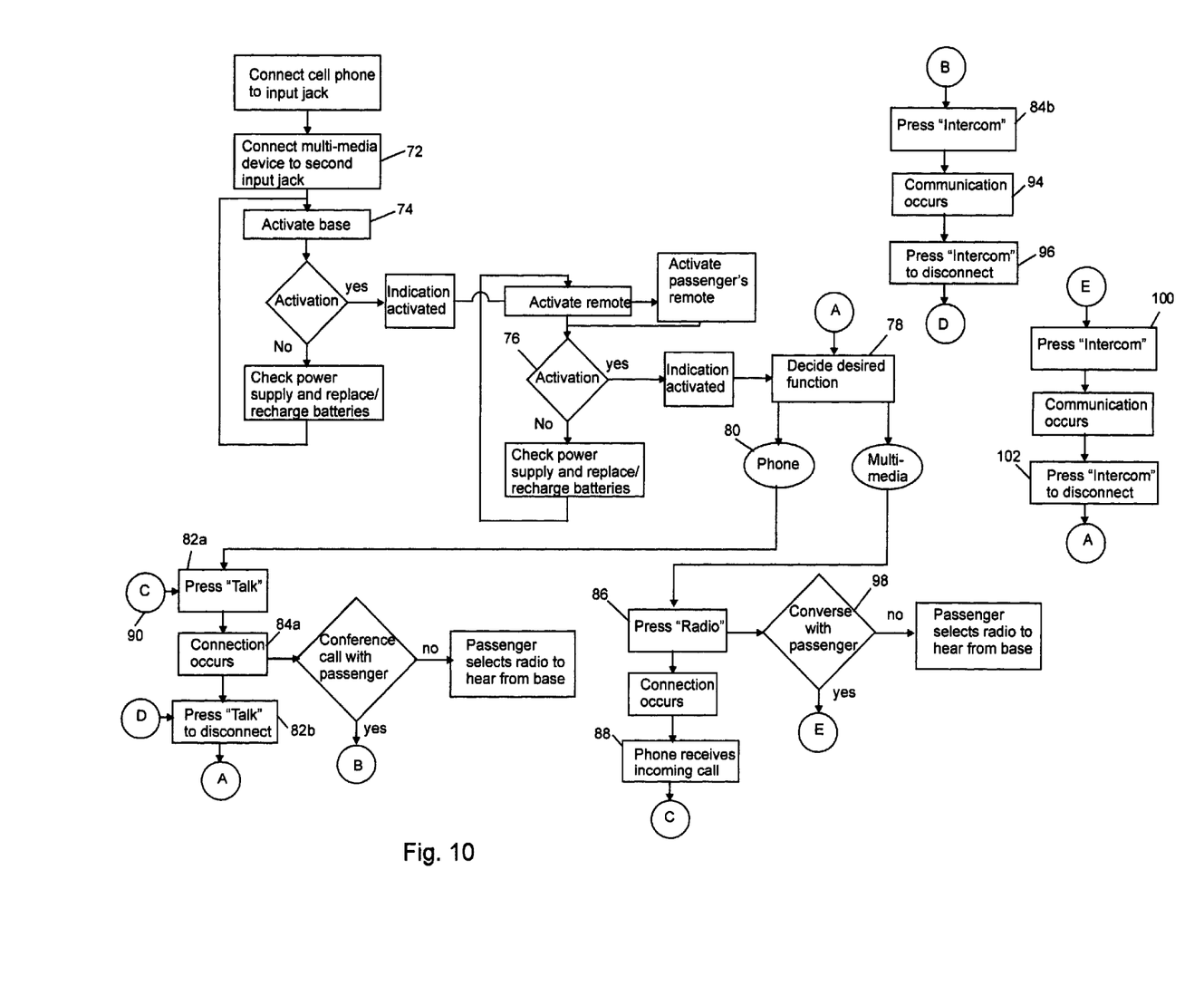
FIG. 10 is a block diagram illustrating the utilization process for the present invention.

The utilization process is shown in FIG. 10. As seen, the cellular pone and musical devices are coupled to the base 72. The unit is then activated 74 via the power switch. This signals that the system is ready for operation. If lights are utilized for powering the system, the user will realize that the system is ready by the visualization of the lights the base. The switch is activated for the remote. Lights indicate that power is being supply to the remote.

The user then activates each conventional element that is coupled to the base. For example if the user is using a radio, then the radio is activated. Next the user selects the desired function. If the user wishes to use the music-multimedia, then the music button is activated on either the remote or on the base. It is noted that the user the user can switch the desired operation at any time. For example, should the user wish to make a call, then the user switches to phone by pressing the talk button and using the keypad of a conventional phone, punches in the desired numbers for dialing.

The user can select intercom, and allow the user to communicate with others who are wearing the head set. Should the user receive a call during the use of other elements, then the user merely selects phone. The conversation can continue as desired. Once the conversation has ended, the phone call is terminated; the user merely selects the desire function or element again. For conference calling, the user merely selects the desired function, such as intercom, allowing an individual with an additional head set to participate in the conversation.

In FIG. 10, the unit is activated via the power button 74. The cellular phone and radio 72 are coupled within the head set and controlled via the controller. If the light is not activated 76, then the unit is not working. If the light is activated, then the user selects operation 78. If the user selects phone 80, then the driver presses "Talk" 82a to enable connection 84a to occur. To terminate the call, "Talk" 82b is pressed again.

If radio is desired, then the radio button is depressed 86. If a phone call is received 88, the driver will receive a signal 88 to enable connection to occur. When the signal is received 90, the phone is activated. If the driver can hear 92, then "Talk" 82a is pressed. This will enable connection 84a. For termination, press "Talk" 82b. For enabling a conference call between two headsets, the user must activate the "Intercom" 84b. The signal will be transmitted to the second headset and the intercom between the first headset and second head set will be activated 94. The "intercom" button is pressed again for termination 96.

To communicate with the passenger 98, press the "Intercom" button 100. The radio will be deactivated enabling communication to occur between the user of the first remote and the user of the second remote. To terminate the conversation press "Intercom" 102.

In an alternative embodiment, optionally, this remote can be used solely as a communication feature. Thus only remotes can be utilized for communication, thereby providing for each remote to be in communication with one another.

Optionally, with the communication-only mode, a base can be provided so as to enable the user to active the remote via the base. The entertainment features, and jacks for multimedia device and telephonic communication and the jack for the cellular phone, would all be eliminated from the base. This scenario is ideally suited for individuals belonging to groups or the like, as it permits communication within a group of workers, such as fire fighters, police officers or the like.

The present invention offers several advantages due to its unique combination of component elements. Transmission is accomplished using Direct Sequence Spread Spectrum (DSSS). Preferably, the present invention will utilize a 2.4 GHz DSSS. The use of this transmission enables point to point transmission or optionally point to multi-point transmission. Thereby allowing the option of either one or multiple individuals to use and enjoy the present invention. As stated previously multiple remotes can be used with a singular base. This option allows for a multitude of individuals to enjoy and utilize the present invention.

Safety in a key issue with the present invention by providing the base to be located on the handlebars, the user has direct access thereto. Visibility is achieve and its location on the handlebars is ideal the drivers.

It is to be understood that the design and configuration of the buttons and instructions or design can be altered and changed for aesthetic purposes.

While the invention has been particularly shown and described with reference to an embodiment thereof, it will be understood by those skilled in the art that various changes in form and detail may be made without departing from the spirit and scope of the invention.

I claim:

1. A communication and entertainment system comprising:
    a base and a remote;
        said base includes first receiving means and an activation means;
            said receiving means includes a means of receiving conventional entertainment elements;
            said receiving means further includes a tangible means for receiving said conventional entertainment elements and said tangible means provides for each of said conventional entertainment elements to be removably secured to said base, said base being a separate entity from said conventional entertainment elements;
            said activation means includes a means of activating said conventional entertainment elements;
        said remote includes an ear set;
            said base and said remote each include a digital signal processor and transmits via direct sequence spread spectrum; and
            said base is wirelessly coupled to said remote for enabling communication to occur between said base and said remote for providing said entertainment elements to be heard via said ear set.

2. A communication and entertainment system as in claim 1 wherein a second receiving means is provided, and said second receiving means includes means for receiving a conventional mobile phone, said remote further includes a microphone, and said activation means further includes a control method for controlling said received conventional entertainment element a control method for controlling said received conventional mobile phone, said second receiving means further includes a tangible means for receiving said conventional mobile phone, said tangible means provides for each of said mobile phone to be removably secured to said base, said base being a separate entity from said mobile phone.

3. A communication and entertainment system as in claim 1 wherein said tangible means of said first receiving means is a first jack and said tangible means of said second receiving means is a second jack, a first audio cable is removably secured to said first jack and a mobile phone cable is removable secured to said second jack for providing said conventional entertainment elements to be removably secured to said base rendering said base to be a separate entity of said conventional entertainment devices.

4. A communication and entertainment system as in claim 3 wherein said control method for controlling said receive conventional entertainment element is an activation button for activating said first jack and said control method for controlling said received conventional mobile phone is a second activation button for activating said second jack.

5. A communication and entertainment system as in claim 4 wherein said remote further includes a volume control.

6. A communication and entertainment system as in claim 5 wherein said remote includes an attaching device and said attaching device enables said remote to be removably secured to a conventional helmet.

7. A communication and entertainment system as in claim 6 wherein said base includes an attaching system and said attaching system enables said base to be removably secured to conventional handle bars.

8. A communication and entertainment system as in claim 7 wherein an indication means is provided to indicate power is provided to said base, and a second indication means is provided on said remote for indication power is provided to said remote.

9. A communication and entertainment system as in claim 4 wherein a second remote is provided, said second remote being in wireless communication with said base, said second remote includes a second ear set and a second microphone, and said base controls said second remote.

10. A communication and entertainment system as in claim 9 where in an intercom system is located within each remote, said intercom system is controlled via said base, said base includes a switch for activation intercom system.

11. A communication and entertainment system as in claim 10 wherein said first remote and second remote each include controls for controlling said intercom system.

12. A communication and entertainment system as in claim 4 wherein said base and said remote are powered via batteries, said batteries are rechargeable, and said base and said remote each include a recharging port for allowing said batteries to be recharged.

13. A communication and entertainment system as in claim 1 wherein said base and said remote is powered via a digital signal processor for allowing wireless communication.

14. A communication and entertainment system as in claim 1 wherein said base includes an arrow shape, said arrow shape provides for an aerodynamic profile.

15. A communication system comprising:
   at least two remotes;
      each of said at least two remotes include a microphone and an ear set;
      each of said at least two remotes includes an activation means;
      each of said at least two remotes include an intercom system;
         said intercom system being controlled wireless via a digital signal processor for allowing wireless communication; and
      each of said at least two remotes include an attaching device for allowing each remote to be attached to a desired location.

16. A communication system as in claim 15 wherein each remote further includes an activation means for indicating each of said remotes being activated and ready for use.

17. A communication and entertainment system comprising:
   a base;
   a remote;
      said base includes a first jack and a second jack;
         said first jack includes an audio cable removably secured thereto;
         said second jack includes a mobile phone cable removably secured thereto;
      a first digital signal processor is located within said base;
      a second digital signal processor is located within said remote;
      said base is in wireless communication with said remote;
      an ear set is secured to said remote;
      a microphone is secured to said remote; and
      an activation means is located on said base for controlling said activation of elements secured in said first jack, elements secured in said second jack, said microphone and said ear set.

18. A communication and entertainment system as in claim 17 wherein said remote includes a second activation means for controlling said activation of elements secured in said first jack, elements secured in said second jack, said microphone and said ear set.

19. A communication and entertainment system as in claim 18 wherein a volume control is located on said remote.

20. A communication and entertainment system as in claim 19 wherein an attaching device is located on said base for enabling attaching to a desired location and said remote includes a second attaching device for enabling attaching to another desired location.

\* \* \* \* \*